United States Patent
Slavik et al.

(10) Patent No.: US 9,584,221 B2
(45) Date of Patent: Feb. 28, 2017

(54) OPTICAL TRANSMITTER

(71) Applicant: University of Southampton, Southampton, Hampshire (GB)

(72) Inventors: Radan Slavik, Southampton (GB); Joseph Kakande, Southampton (GB); David Richardson, Southampton (GB)

(73) Assignee: University of Southampton, Southampton, Hampshire (GB)

( * ) Notice: Subject to any disclaimer, the term of this patent is extended or adjusted under 35 U.S.C. 154(b) by 0 days.

(21) Appl. No.: 14/427,656

(22) PCT Filed: Sep. 13, 2013

(86) PCT No.: PCT/GB2013/052408
§ 371 (c)(1),
(2) Date: Mar. 12, 2015

(87) PCT Pub. No.: WO2014/041368
PCT Pub. Date: Mar. 20, 2014

(65) Prior Publication Data
US 2015/0249504 A1 Sep. 3, 2015

(30) Foreign Application Priority Data
Sep. 13, 2012 (GB) .................................. 1216370.5

(51) Int. Cl.
*H04B 10/50* (2013.01)
*H04B 10/556* (2013.01)
(Continued)

(52) U.S. Cl.
CPC ......... *H04B 10/504* (2013.01); *H04B 10/516* (2013.01); *H04B 10/5561* (2013.01); *H04B 10/572* (2013.01); *H04B 10/58* (2013.01)

(58) Field of Classification Search
CPC ............................ H04B 10/504; H04B 10/516
See application file for complete search history.

(56) References Cited

U.S. PATENT DOCUMENTS

2004/0101317 A1* 5/2004 Yap ........................ H04B 10/50
398/187
2005/0013612 A1* 1/2005 Yap ........................ G02F 2/002
398/53
(Continued)

FOREIGN PATENT DOCUMENTS

DE 19637229 A1 3/1998

OTHER PUBLICATIONS

Walton et al., *High-Performance Heterodyne Optical Injection Phase-Lock Loop Using Wide Linewidth Semiconductor Lasers*, IEEE Photonics Technology Letters, vol. 10, No. 3, Mar. 1, 1998; XP-000740692. 3 pages.
(Continued)

*Primary Examiner* — Dzung Tran
(74) *Attorney, Agent, or Firm* — Sunstein Kann Murphy & Timbers LLP

(57) ABSTRACT

An optical transmitter, comprising: a master laser device for generating a master signal; one or more slave laser devices, injected with the master signal such that signals generated by the one or more slave laser devices are phase-locked with the master signal; an input for receiving one or more data streams to be transmitted, the one or more data streams being used to modulate respectively the one or more slave laser devices, such that each signal generated by the one or more slave laser devices respectively comprises a modulated part and a carrier part; and an interfering arrangement, for destructively interfering the signals generated by the one or more slave laser devices with a signal derived from the master signal, so as to generate an output signal in which the carrier part is at least partially cancelled. In embodiments, the transmitter comprises multiple slave laser devices, whose outputs can be coherently multiplexed together to generate multiple-bit output signals.

14 Claims, 2 Drawing Sheets

(51) Int. Cl.
    *H04B 10/572*    (2013.01)
    *H04B 10/58*     (2013.01)
    *H04B 10/516*    (2013.01)

(56) References Cited

U.S. PATENT DOCUMENTS

2011/0122912 A1*   5/2011   Benjamin ............. H01S 5/4006
                                                             372/50.124
2012/0251129 A1*  10/2012   Delfyett ................ H01S 5/0656
                                                              398/188

OTHER PUBLICATIONS

International Searching Authority—EPO, International Search Report PCT/GB2013/052408; dated Jan. 28, 2014. 3 pages.
UK Intellectual Property Office, GB Search Report GB 1216370.5 dated Jan. 10, 2013. 1 page.

* cited by examiner

OPTICAL TRANSMITTER

TECHNICAL FIELD

The present invention relates to photonics, and particularly to an optical transmitter for transmitting modulated optical communication signals.

BACKGROUND

The biggest challenge in optical telecommunications today is increasing the capacity of installed fibre links to maintain the year-on-year growth in demand for bandwidth. It has been acknowledged within the industry that transitioning to high spectral efficiency coherent modulation formats such as quadrature phase-shift keying (QPSK), quadrature amplitude modulation (QAM) and the like is important, and 100 Gbit/s QPSK has been deployed on several long haul links worldwide. These modulation formats include modulation in phase, and thus the use of low-cost direct modulation of the signalling laser is not possible due to the high chirp associated with direct modulation of a semiconductor laser, which significantly limits transmission distance.

Today, the most robust solution for generating complex modulation formats is the $LiNbO_3$-based external IQ modulator. However, its drawbacks include: (i) relatively high cost; (ii) significant insertion loss and limited optical power handling; (iii) a need for high drive voltage RF booster amplifiers; and (iv) for generation of complex modulation formats (e.g., 16 QAM), a typical IQ modulator requires two or more high-speed multiple-level (e.g. four logic levels for 16 QAM) data streams to be generated and multiplexed in the electronic domain with associated loss, power consumption, noise and non-linearity.

SUMMARY OF INVENTION

In order to transmit modulated optical signals over long distances, the present invention provides an optical transmitter with at least one master laser device used to inject a master laser signal to one or more slave laser devices. In this way the slave laser devices become locked in phase with the master laser device and chirp in their output is reduced. The slave laser device outputs can be modulated according to one or more data signals to be transmitted and, because they are locked in phase, the master laser signal (or a signal derived from it) can be used to destructively interfere and thus cancel a carrier part of the slaver laser device output. The output signal so produced has low chirp and can easily be modulated according to complex modulation schemes. Moreover, where more than one slave laser device is employed, all slave laser devices are locked to the same master laser device and therefore are also locked with each other. This allows the slave laser outputs to be coherently multiplexed.

According to a first aspect of the present invention, there is provided an optical transmitter, comprising: a master laser device for generating a master signal; one or more slave laser devices, injected with the master signal such that signals generated by the one or more slave laser devices are phase-locked with the master signal; an input for receiving one or more data streams to be transmitted, the one or more data streams being used to modulate respectively the one or more slave laser devices, such that each signal generated by the one or more slave laser devices respectively comprises a modulated part and a carrier part; and an interfering arrangement, for destructively interfering the signals generated by the one or more slave laser devices with a signal derived from the master signal, so as to generate an output signal in which the carrier part is at least partially cancelled.

In embodiments, the transmitter comprises multiple slave laser devices, whose outputs can be coherently multiplexed together to generate multiple-level output signals.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
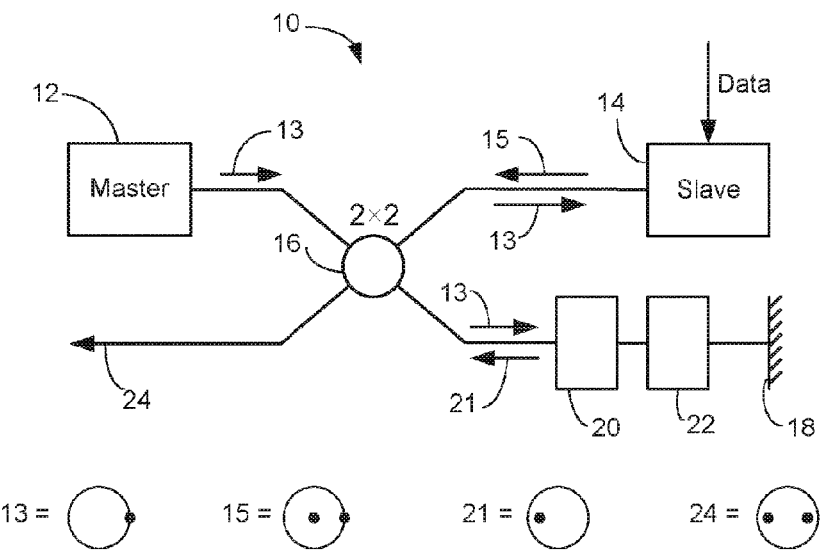
FIG. 1 shows an optical transmitter according to embodiments of the present invention.

FIG. 1 shows an optical transmitter 10 according to embodiments of the present invention. Schematic constellation diagrams show the modulation of the signals.

The transmitter 10 comprises a master laser device 12 and a slave laser device 14 designed to emit light at the same, or substantially the same wavelength. The master laser device 12 is controlled to generate a master laser signal 13, and this is fed to one coupling port (an input, see below) of a 2×2 interferometric coupler 16. The coupler 16 comprises two ports at one end of a cavity in which signals can interfere with each other, and two ports at the other end. In general the coupler is operated in both directions (that is, signals are input and output from both sides of the cavity). However, the convention which will be adopted herein is that ports on the left-hand side of the drawings are termed "inputs" and those on the right-hand side are termed "outputs".

The master laser signal is generally unmodulated, and so provides a largely constant signal. The master laser device may be operated in continuous wavelength (CW) mode in order to achieve such an output. The slave laser device 14 is coupled to an output coupling port on the opposite side of the interferometric coupler 16, and thus the master laser signal is passed from the master laser device 12 to the slave laser device 14.

The master laser signal is used to injection lock the slave laser device 14, and in this way a slave laser signal 15 produced by the slave laser device is locked in phase with the master laser signal 13, meaning the frequency of the slave laser signal follows that of the master laser signal. Moreover, chirp in the slave laser signal is suppressed.

Optical injection locking is an effect in which a 'seed' laser signal (such as the master laser signal 13) launched into another laser device (such as the slave laser device 14) causes the latter device to oscillate coherently with the seed signal. In an ordinary laser, the phase of the light emitted depends primarily on the noise in the gain medium. With injection locking, the seed laser 'overrules' the gain medium noise, causing the laser output (slave laser signal 15) to have the same phase as the seed signal (master laser signal 13). This process is also commonly called 'optical phase locking' of the two signals.

An input provides a data stream to be transmitted. In one embodiment, the data is binary, i.e. has just two logic levels ("0" and "1"); however, in other embodiments the data may have a higher number of logic levels ("0", "1", "2", etc). The data stream is provided to the slave laser device 14 and used to modulate the slave laser device output. In one embodiment the slave laser signal 15 is amplitude modulated according to the data stream, and particularly may be modulated using on-off keying (OOK); that is, the slave laser output may be switched off when the data stream indicates a bit which is at a low logic level, and switched on when the data stream indicates a bit which is at a high logic level. In the illustrated embodiment, where the input data stream has two logic levels, the slave laser signal 15 can thus take two values: one in the centre of the constellation diagram (i.e. "off") and one at the right of the constellation diagram (i.e. corresponding to the master laser signal).

For example, the electric data stream that is sent to the slave laser device 14 may be encoded in voltage, e.g., 0 V means bit '0', while 2 V means bit '1'. In this case, when 0 V is present in the data signal, there is no current going through the laser and thus it is OFF and does not emit any light (laser signal); when 2 V is present, current flows through the laser (according to Ohm's law: Current=Voltage/Laser_Resistence) causing it to be ON. This is commonly called 'direct modulation': when current goes through the slave laser device it emits light, and when there is no current, the slave laser device emits no light. In practice, however, different voltage levels may be used to reduce laser transients, etc, in moving from an ON state to an OFF state and vice versa. For example, the voltage levels may be set at 1 V (for a low logical level) and 3 V (for a high logical level). In this case, the slave laser device is not switched off entirely when the data stream is at a low logical level, but rather produces a current which is relatively low compared to the current when the data stream is at a high logical level.

In this way, the slave laser signal 15 is modulated with data. This modulation is similar to binary phase-shift keying (BPSK), but with an offset commonly termed the "carrier" part of the signal.

The transmitter 10 further comprises a mirror (or other reflective device) 18 which is coupled to a third port of the interferometric coupler 16 (one of the "output" ports). The master laser signal 13 is thus passed to the mirror 18 as well as the slave laser device 14. The master laser signal 13 is reflected off the mirror 18 and travels back towards the interferometric coupler 16. A phase shift device 20 and a scaling device 22 (which applies a scaling factor) act on the signal in both directions (i.e. towards and away from the mirror 18) and thus a compensating signal 21 is output to the coupler 16 which corresponds to a scaled, phase-shifted copy of the master laser signal 13. The scaling factor is a positive number and can be greater than 1 (i.e. an amplification) or less than 1 (i.e. an attenuation). Where the scaling factor is less than 1, the scaling device 22 may comprise an optical attenuator. Where the scaling factor is greater than 1, the scaling device 22 may comprise an optical amplifier (e.g., erbium-doped fiber amplifier (EDFA) or a semiconductor amplifier (SOA)).

The phase shift and scaling factor are chosen such that the slave laser signal 15 and the compensating signal 21 destructively interfere with one another in the interferometric coupler 16, and the carrier part of the slave laser signal is reduced or substantially cancelled. The precise values which are chosen may vary according to the nature of the master laser device 12 and the slave laser device 14. In this example, a π phase shift and an attenuation of 50% in the power intensity, both relative to the slave laser signal 15, would be appropriate to substantially cancel the carrier part of the slave laser signal (although these factors may change for alternative modulation schemes—see below).

The master laser signal 13 and the slave laser signal 15 are locked in phase with one another, and thus the compensating signal 21 is also locked in phase. This allows a constant destructive interference to remove the offset in the slave laser signal and produce an output signal (provided to an output 24 of the transmitter) which corresponds to a BPSK modulation scheme, i.e. an output signal with two logical levels centred on the constellation diagram. If a greater number of logic levels is used to modulate the slave laser device, a greater number of logic levels can be provided in the output signal, of course. In addition, the output signal is largely chirp-free due to the optical injection locking of the slave laser device by the master laser signal.

Figure 2:
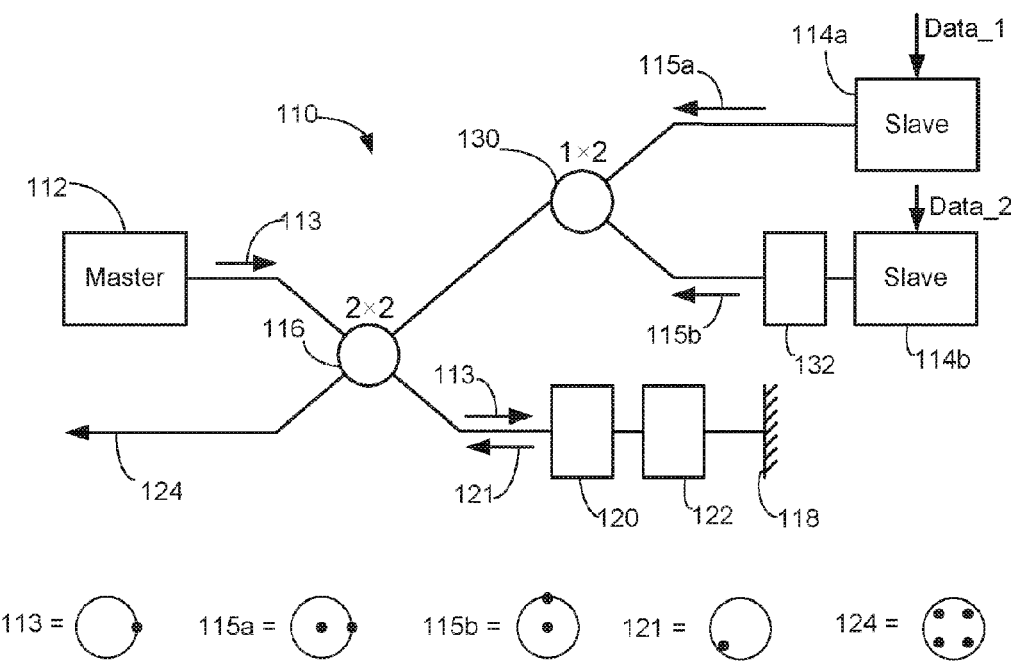
FIG. 2 shows an optical transmitter according to further embodiments of the present invention.

The principles of the present invention can be applied to increase the complexity of the modulation schemes in the output signal. FIG. 2 shows an optical transmitter 110 according to embodiments of the present invention, which is suitable to generate output signals having four or more logic levels (i.e. QPSK, 16 QAM, etc).

The transmitter 110 again comprises a master laser device 112 which produces a master laser signal 113 and provides this to an input port of a 2×2 interferometric coupler 116. The input of a 1×2 interferometric coupler 130 is coupled to an output port of the coupler 116 and thus receives the master laser signal 113. Two slave laser devices 114a, 114b are connected respectively to the two outputs of the coupler 130, and thus the master laser signal 113 is again used to optically pump the slave laser devices. In this way, as before, the outputs of the slave laser devices are locked in phase with the master laser signal and chirp is suppressed.

Two inputs provide two independent binary data streams Data_1, Data_2 to be transmitted, with each data stream being used to modulate the output of a respective slave laser device. As before, the outputs may be amplitude modulated according to the data streams.

In embodiments where the transmitter 110 produces a four-level modulated output signal, each data stream may comprise binary data and each slave laser device 114a, 114b may be on-off keyed according to its corresponding data stream (as described above). In other embodiments, the transmitter 110 may be used to produce 16-level modulated output signals (or higher) and each data stream provides a corresponding component of the output signal data. For example, where the output signal is 16-level, each input data stream may have four logic levels (e.g. 0, 1, 4, 9 V), with the outputs of the slave laser devices modulated between four amplitude levels.

One of the slave laser devices 114b is coupled to a phase shift component 132, and this is used to shift the output of the slave laser device 132 such that the respective slave laser signals 115a, 115b are phase-locked together but shifted in phase with respect to each other. For example, the phase shift component 132 may apply a phase shift such that the second slave laser signal 115b is shifted π/2 with respect to the first slave laser signal 115a. In this way, the first slave laser signal 115a can represent the in-phase, or I component of the output signal, while the second slave laser signal 115b can represent the out-of-phase, or Q component of the output signal. The two slave laser signals 115a, 115b are provided to the interferometric coupler 130, where they are combined (i.e. multiplexed), before being provided to an output port of the coupler 116. The combined slave laser signal output from the coupler 130 to the coupler 116 thus corresponds to a multi-level signal which is offset from the centre of the constellation diagram due to the "carrier" part.

As with the transmitter 10 described above, the transmitter 110 further comprises a mirror (or other reflective device) 118 which is coupled to the other output port of the interferometric coupler 116. The master laser signal 113 is passed to the mirror 118 as well as the slave laser devices 114a, 114b. The master laser signal 113 is reflected off the mirror 118 and travels back towards the interferometric coupler 116. A phase shift device 120 and a scaling device 122 act on the signal in both directions and thus a compensating signal 121 is output to the coupler 116 which corresponds to a scaled, phase-shifted copy of the master laser signal 113. The values of the scaling factor and the phase shift are in general different to those applied in the transmitter 10. The values chosen depend on the power outputs of the slave laser devices, the injecting ratio (i.e. the ratio of the slave laser signals to the master laser signal necessary to achieve injection-locking), and the degree of coupling provided by the coupler 116 (which may not couple the slave laser signals equally). All of these factors may vary according to the particular application and the lasers used. For example, the injecting ratio may vary from 0.01 (−20 dB) to 10 (10 dB). Assuming the degree of coupling is equal, and each slave laser device outputs 1 mW, the phase shift can be set equal to $\pi/4$ and the scaling factor applied such that the power of the compensating signal is 0.705 mW $$\left(\text{i.e. } \frac{\sqrt{2}}{2} \text{mW}\right).$$

When combined in the interferometric coupler 116, the compensating signal 121 acts to reduce or substantially cancel the carrier part of the combination of the slave laser signals 115a, 115b, i.e. reducing or cancelling the offset such that the possible output values are centred with respect to the constellation diagram.

In the illustrated embodiment, where each slave laser device 114a, 114b is modulated between two levels according to respective two-level data streams, the output signal provided to the output 124 substantially corresponds to a quadrature phase-shift keying (QPSK) modulation scheme. However, it can be seen how the transmitter 110 might generate higher-order modulation schemes. For example, if each slave laser device 114a, 114b is modulated according to respective four-level data streams, the in-phase slave laser signal 115a can take one of four amplitude values, and the out-of-phase slave laser signal 115b can also take one of four amplitude values. Their combination, with the compensating signal 121, thus substantially corresponds to 16 QAM.

The transmitter 110 can therefore be used to transmit optical signals modulated with 4- or 16-level data. The two slave laser devices 114a, 114b can each be modulated with binary data (to generate a four-level output signal), four-level data (to generate a 16-level output signal) and so on. In order to generate a 16-level output signal, it will further be clear to those skilled in the art that the number of slave laser devices can be increased correspondingly (to four) without departing from the principles and scope of the invention.

Figure 3:
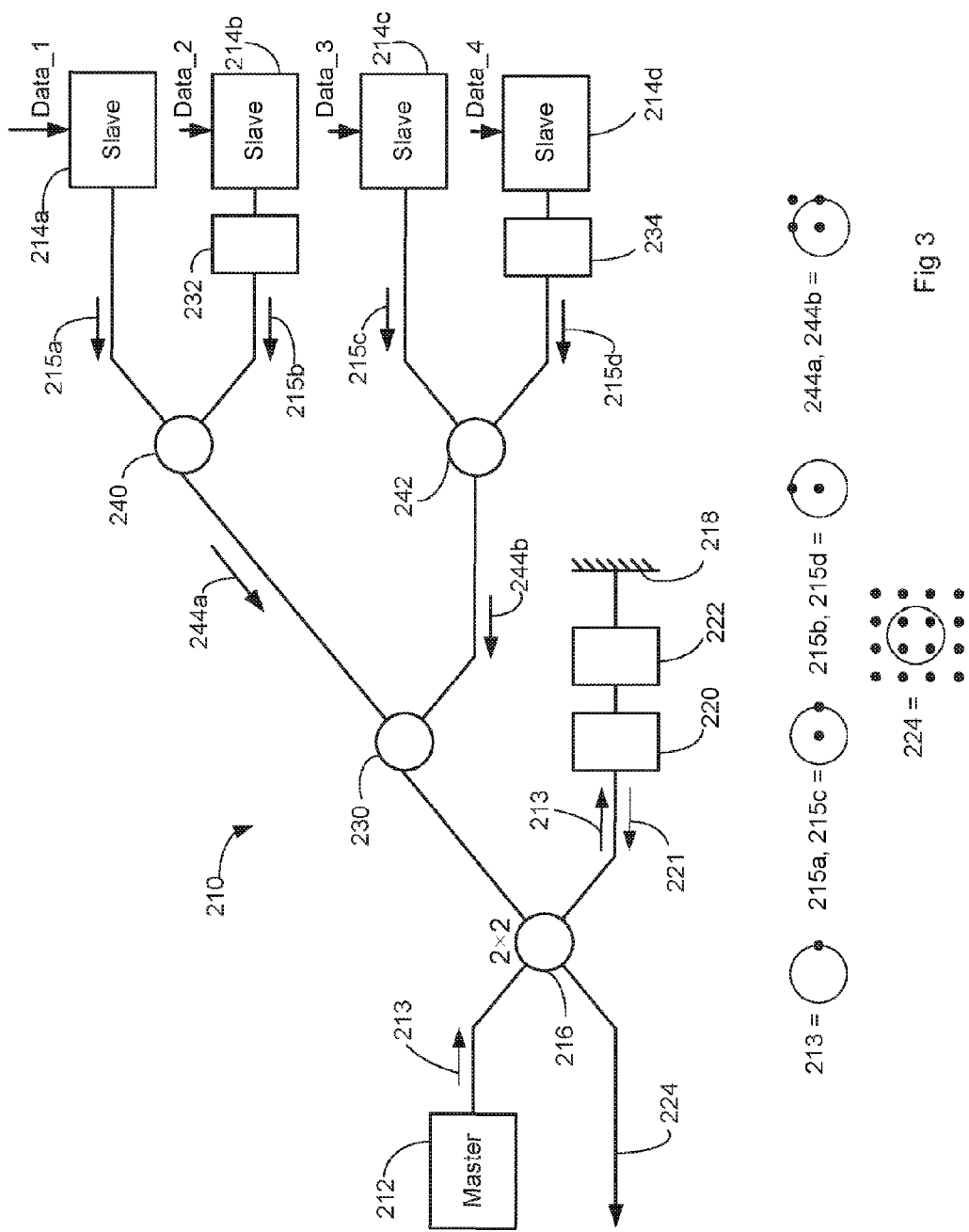
FIG. 3 shows an optical transmitter according to yet further embodiments of the present invention.

FIG. 3 shows an optical transmitter 210 adapted to transmit output signals modulated with 16 or more levels (i.e. where each symbol in the output signal represents four or more bits of data).

Like components are indicated with like reference numerals (but with a "2" preceding them) and will not be described again in any detail. For example, the master laser device 212 corresponds substantially to the master laser device 112 described above, and so on.

In this embodiment, the transmitter 210 comprises four slave laser devices 214a, 214b, 214c, 214d, all of which are optically injection locked with the master laser signal so as to generate signals which are phase-locked with one another. The outputs of the coupler 230 are provided to the inputs of two further 1×2 interferometric couplers 240, 242; the outputs of the coupler 240 are coupled to first and second slave laser devices 214a, 214b; and the outputs of the coupler 242 are coupled to third and fourth slave laser devices 214c, 214d. The outputs of the second and fourth slave laser devices 214b, 214d are coupled to respective phase shifts 232, 234 such that the second and fourth slave laser signals 215b, 215d are shifted in phase with respect to the first and third slave laser signals 215a, 215c. The phase shifts applied by the components 232, 234 are generally the same, and may be set equal to $\pi/2$ such that the first and third slave laser signals 215a, 215c together provide the in-phase (I) component of the output signal, and the second and fourth slave laser signals 215b, 215d together provide the out-of-phase (Q) component of the output signal.

Each slave laser device is modulated according to a respective data stream, and in the illustrated embodiment each data stream is binary data (so as to create a 16 QAM output signal). Applying the principles described above, it will be apparent that each data stream may have more than two amplitude levels, in which case the output signal correspondingly has more levels.

If the first slave laser signal 215a had the same amplitude as the third slave laser signal 215c, the I component of the output signal would take the same value if one of them was "on" and the other was "off", regardless of which slave laser signal was on or off, i.e. there would be no difference between the logic signals 01 and 10. A similar situation arises for the Q component if the second and fourth laser signals 215b, 215d have the same amplitude. Therefore the first and second slave laser signals 215a, 215b have the same amplitude as each other, but a different amplitude to the third and fourth slave laser signals 215c, 215d. For example, the third and fourth slave laser signals may have an amplitude (i.e. power intensity) with is four times that of the first and second slave laser signals. Note that the constellation diagrams shown in the Figures illustrated the electric field intensity, i.e. Power intensity=$|E|^2$.

The combination 244a of the first and second slave laser signals 215a, 215b thus corresponds to a four-level signal with a first carrier offset (similar to the combination of signals 115a, 115b described above); the combination 244b of the third and fourth laser signals 215c, 215d also corresponds to a four-level signal with a second carrier offset. These two combined signals 244a, 244b are themselves combined in the coupler 230, and then provided to the coupler 216. In the coupler 216, they are combined with the phase-shifted, scaled master laser signal 221 and the carrier part of the signal reduced or cancelled through destructive interference. The output signal provided to the output 224 is therefore modulated with 16-level data, and substantially corresponds to 16 QAM modulation.

In the examples given above, the laser devices (both master and slave) may be distributed feedback (DFB) lasers, or other suitable lasers as would be known to those skilled in the art. All of the transmitters described above may be provided on a single photonic chip.

The polarization of optical signals within the optical transmitters described above may be controlled or maintained in order to achieve optimal interference between signals (i.e. destructive interference to cancel the carrier, and 90-degree interference to multiplex more than one modulated slave laser signal). For example, the polarization of the master laser signal may be controlled as it enters the slave laser device(s); the polarization of the slave laser signals may be controlled as they are multiplexed together; the polarization of the compensating signal may be controlled prior to destructive interference in the interferometric coupler. For example, the components of the transmitter may be polarization-maintaining. This is straightforward if the transmitter is integrated on a single photonic chip, but if components are inter-connected using optic fibres, these may be polarization-maintaining. Alternatively, polarization may be controlled and adapted as necessary using polarization trackers.

Each of the transmitters described above comprises a mirror 18, 118, 218 or other reflective device. However, it will be apparent to those skilled in the art that, in order to achieve the destructive interference which cancels the carrier part of the slave laser signals, the compensating signal 21, 121, 221 must be coherent with the slave laser signals. Thus, instead of a reflective device, the compensating signal can be generated using an unmodulated slave laser device (not illustrated) which is phase-locked with the master laser device through, for example, injection locking as described above. In such embodiments, the scaling devices 22, 122, 222 can be omitted as the unmodulated slave laser device can be set to generate a signal with a suitable amplitude as required. Thus an unmodulated slave laser device can be arranged to effectively perform the functions of both the reflective device and the scaling device.

It will also be apparent to the skilled reader that alternative arrangements of slave laser devices and couplers to those illustrated may be used to generate output signals in accordance with the principles of the present invention but without departing from the scope of the claims appended hereto. For example, each of the transmitters in the illustrated embodiments comprises a single mirror or reflective device, and a single corresponding destructive interference to cancel the carrier part of the slave laser signals. However, more than one signal may be derived from the master laser signal and used to interfere destructively with the slave laser signals at multiple different points in the system. Further, the arrangement of slave laser devices may differ from those set out in the illustrated embodiments. For example, FIG. 3 illustrates two pairs of in-phase and out-of-phase slave laser devices coupled to respective couplers 240, 242. However, both in-phase slave laser devices may be coupled to one coupler, and both out-of-phase slave laser devices coupled to another coupler. It will be apparent that changes such as these do not affect the operation of the transmitters and fall within the scope of the claims appended hereto. The linear, coherent superposition of slave laser signals and compensating signals can be carried out in any order.

The present invention thus provides optical transmitters which can be used to generate optical signals modulated with two or more levels of data (e.g. 2, 4, 9, 16, etc), and in which chirp and also the carrier are controlled, or suppressed. Transmitters according to embodiments of the present invention do away with the need for discrete booster RF amplifiers and external modulators, and thus have the potential to be much lower cost than existing transmitters. The transmitters also have the potential to operate at very high speeds (operating at bandwidths in excess of 80 GHz) compared to existing transmitters.

Those skilled in the art will appreciate that various amendments and alterations can be made to the embodiments described above without departing from the scope of the invention as defined in the claims appended hereto.

The invention claimed is:

1. An optical transmitter, comprising:
   a master laser device configured for generating a master optical signal;
   one or more slave laser devices in communication with the master laser device and configured to be injected with the master optical signal such that slave optical signals generated by the one or more slave laser devices are phase-locked with the master optical signal;
   a transmission data stream input configured for receiving one or more transmission data streams to be transmitted, the one or more transmission data streams being used to amplitude modulate respectively the one or more slave laser devices such that each slave optical signal comprises a modulated part and a carrier part; and
   an optical interfering arrangement configured for destructively interfering the slave optical signals with an optical interfering signal derived from the master optical signal so as to generate an output optical signal in which the carrier part is at least partially cancelled.

2. The optical transmitter according to claim 1, wherein the optical transmitter comprises a plurality of slave laser devices.

3. The optical transmitter according to claim 2, wherein the slave optical signals are shifted in phase with respect to each other.

4. The optical transmitter according to claim 2, wherein at least a first slave optical signal has a different amplitude from a second slave optical signal.

5. The optical transmitter according to claim 2, wherein the output optical signal corresponds to a combination of the slave optical signals.

6. The optical transmitter according to claim 5, wherein the optical interfering arrangement is further configured for combining the slave optical signals.

7. The optical transmitter according claim 1, wherein the transmission data streams are binary data streams.

8. The optical transmitter according to claim 1, wherein the optical interfering signal is derived from the master optical signal by applying one or more of a phase shift and a scaling factor.

9. The optical transmitter according to claim 1, wherein the one or more slave laser devices are on-off keyed according to the respective transmission data stream.

10. The optical transmitter according to claim 1, wherein the optical interfering signal is arranged to generate the output optical signal in which the carrier part is substantially cancelled.

11. The optical transmitter according to claim 1, wherein the optical interfering arrangement comprises one or more interferometric couplers.

12. The optical transmitter according claim 1, wherein the optical interfering arrangement includes signal coupling ports for the master optical signal, the optical interfering signal, the one or more slave optical signals, and the output optical signal.

13. The optical transmitter according to claim 1, wherein the output optical signal is modulated according to a phase shift keying modulation scheme or a quadrature amplitude modulation scheme.

14. A photonic chip comprising the optical transmitter according to claim 1.

* * * * *